United States Patent [19]

Yomogida et al.

[11] Patent Number: 4,504,900
[45] Date of Patent: Mar. 12, 1985

[54] SEQUENCE INSTRUCTION DISPLAY SYSTEM

[75] Inventors: Toshihiko Yomogida, Kariya; Itaru Sakurai, Nagoya; Tsuyoshi Yokota, Okazaki; Sadamu Kato, Takahama, all of Japan

[73] Assignee: Toyoda Machine Works, Ltd., Kariya, Japan

[21] Appl. No.: 346,248

[22] Filed: Feb. 5, 1982

[30] Foreign Application Priority Data

Feb. 10, 1981 [JP] Japan ............................ 56-18685

[51] Int. Cl.³ ........................ G06F 9/06; G06F 15/46
[52] U.S. Cl. .................................. 364/140; 364/147; 364/900
[58] Field of Search ............................. 364/140–147, 364/200, 900; 371/16, 17, 29

[56] References Cited

U.S. PATENT DOCUMENTS

| | | | |
|---|---|---|---|
| 3,686,639 | 8/1972 | Fletcher et al. | 364/147 X |
| 3,964,026 | 6/1976 | Yamauchi et al. | 340/172.5 |
| 4,025,902 | 5/1977 | Nakao et al. | 364/147 X |
| 4,058,711 | 11/1977 | Ondercin et al. | 364/147 X |
| 4,227,247 | 10/1980 | Kintner | 364/147 X |

Primary Examiner—Joseph F. Ruggiero
Attorney, Agent, or Firm—Oblon, Fisher, Spivak, McClelland & Maier

[57] ABSTRACT

A sequence instruction display system for use with a programmable sequence controller for displaying a desired sequence instruction and the on-off state of the input or output element corresponding thereto. A buffer memory is provided for storing input and output instructions along with the corresponding on-off states transmitted from a program memory of the sequence controller on an on-line basis with the scan of the program memory in the sequence controller. A numeric key is provided to designate an output instruction. A comparator, on detecting the coincidence of the designated output instruction with an output instruction transmitted from the sequence controller, outputs a signal so as to prevent the buffer memory from further storing the input and output instructions. A data display device displays at a time one of the input and output instructions along with the on-off state stored in the buffer memory.

10 Claims, 12 Drawing Figures

| m−1 | OUT | Y3 |
| m | STR | X1 |
| m+1 | OR | X2 |
| m+2 | AND | X3 |
| m+3 | AND | X4 |
| m+4 | OUT | Y4 |

| | |
|---|---|
| 0 | |
| ⋮ | ⋮ |
| n-1 | OUT Y3 0 |
| n | STR X1 1 |
| n+1 | OR X2 0 |
| n+2 | AND X3 0 |
| n+3 | AND X4 1 |
| n+4 | OUT Y4 0 |
| ⋮ | ⋮ |
| 63 | |

FIG. 7(b)

| | |
|---|---|
| 0 | AND X4 1 |
| 1 | OUT Y4 0 |
| ⋮ | ⋮ |
| 60 | OUT Y3 0 |
| 61 | STR X1 1 |
| 62 | OR X2 0 |
| 63 | AND X3 0 |

| 0 | STR X1 1 |
| 1 | OR X2 0 |
| 2 | AND X3 0 |
| 3 | AND X4 1 |
| 4 | OUT Y4 0 |
| ... | |
| 63 | |

FIG. 10

SEQUENCE INSTRUCTION DISPLAY SYSTEM

BACKGROUND OF THE INVENTION

1. Field of the Invention

The present invention generally relates to a sequence instruction display system for use with a programmable sequence controller for displaying a sequence instruction and the on-off state of a corresponding input or output element.

2. Description of the Prior Art

A programmable sequence controller automatically controls a controlled-objective such as a machine tool in accordance with a sequence program, which includes a large number of sequence instructions. The prior art display system is capable of displaying desired sequence blocks, each of which is made up of one output element and several input elements, and further displaying the on-off state of the elements. Such a system is disclosed in U.S. Pat. No. 3,964,026 to Nobuharu Yamauchi, et al. Using the prior art display system, an operator can check a sequence block when a machine problem has occurred or, in other words, when an output element has not been energized, and he can determine the cause of the machine problem or an input element which concerns the energization of the output elements. Further, the operator can check sequence instructions of a certain sequence block and modify the same if desired.

However, such a prior art display system can be used only with a sequence controller which has the function of accepting an interrupt signal from the display system so as to halt the execution of the sequence control operations thereof and to send the sequence program stored in a program memory thereof to the display system. The prior art display system is provided with means to designate a memory address of the program memory so that a certain sequence instruction is transferred to the display system during the period when the execution of the sequence control operations is being interrupted. The interruption may cause a problem in the sequence control operations, because the scan of the program memory in the sequence controller is interrupted thereby to affect controlling a controlled objective.

Further, some sequence controllers, which are relatively small and inexpensive, have no such interruption function. In particular, a so-called one board sequence controller, which is made of plated printed circuits on a single substrate, does not have such a function. Therefore, it is desired to provide a display device which can be used with a sequence controller with no interruption function, and it is also desired to provide a display system which does not interrupt the execution of the sequence control operations of a sequence controller.

SUMMARY OF THE INVENTION

Accordingly, it is a primary object of the present invention to provide an improved sequence instruction display system for displaying a sequence instruction and the on-off state of the corresponding input or output element which does not interrupt the sequence control operations of a sequence controller used therewith.

Another object of the present invention on is to provide an improved sequence instruction display system as set forth above which is capable of storing a desired sequence block in a buffer memory thereof on an on-line basis with the scan of a program memory in a sequence controller used therewith.

Briefly, according to the present invention, these and other objects are achieved by providing a sequence instruction display system for displaying the input and output instructions and the corresponding on-off states. The sequence instruction display system is used with a sequence controller which includes a program memory for storing a sequence program composed of a plurality of sequence blocks, each of which has one output instruction and at least one input instruction. Memory means is provided for storing the input and output instructions and the corresponding on-off states. Data transfer means is connected to the memory means for transferring the input and output instructions and the corresponding on-off states one after another from the sequence controller to the memory means synchronously with the scan of the program memory in the sequence controller. Designating means is connected to the data transfer means for designating a desired output instruction. Storing control means is connected to the data transfer means for detecting that the sequence block which has the output instruction designated by the designating means is stored in the memory means to prevent the data transfer means from further transferring the input and output instructions and the corresponding on-off states to the memory means. Display means is connected to the data transfer means for reading out one of the input and output instructions and the corresponding on-off states from the memory means to display the same.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIGS. 7($a$) and 7($b$) are explanatory charts illustrating the organization of the buffer memory and a sequence program stored therein;

DETAILED DESCRIPTION OF PREFERRED EMBODIMENTS

Figure 1:
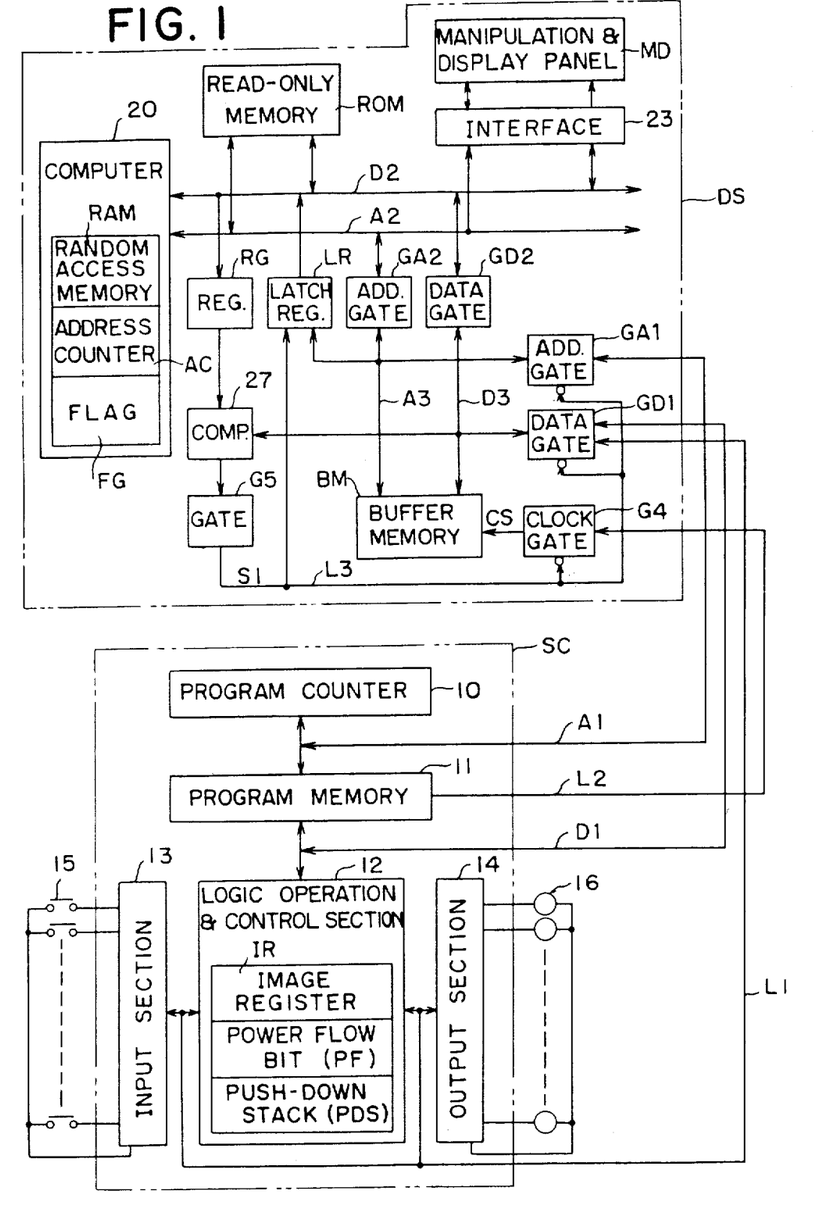
FIG. 1 is a block diagram illustrative of a programmable sequence controller and a sequence instruction display system according to the present invention.

Referring now to the drawings, wherein like reference numerals or characters refer to identical or corresponding parts throughout the several views, and more particularly to FIG. 1 thereof, a programmable sequence controller SC and a sequence instruction display system DS according to the present invention are illustrated. The programmable sequence controller SC includes a program counter 10, a program memory 11, a logic operation and control section 12, and input and output circuit sections 13 and 14. The logic operation and control section 12 is connected to the program memory 11 and to the input and output circuit sections 13 and 14. The input circuit section 13 is connected to input elements 15, such as limit switches, and the output circuit section 14 is connected to output elements 16, such as relays. The program memory 11 has stored therein a sequence program which includes a number of input and output instructions, as will be described below. The program memory 11 has many memory cells with 12-bit memory addresses in a regular order, and is addressed by the program counter 10 connected thereto. The logic operation and control section 12 is provided with an image register IR, a power flow bit PF and a push down stack PDS so as to carry out, in accordance with the sequence program stored in the memory 11, a series of sequence control operations by repeatedly performing tests on the input and output elements 15 and 16 connected to the input and output circuit sections 13 and 14, wherein the energization and deenergization of the output elements 15 are based upon results of the tests. The details and the operation of the image register IR, the power flow bit PF and the push down stack PDS are described in U.S. Pat. No. 4,215,395 to Michael L. Bunyard, et al. However, the sequence controller SC is not limited to such a sequence controller as described in that U.S. patent, and other types of sequence controllers can be used with the display system DS according to the present invention.

The instruction, which is a binary code made up of a plurality of bits such as, for example, 16 bits, is stored in each memory cell of the program memory 11. Each instruction is composed of a command part for instructing a sequence control operation and an operand containing address data for selecting one of the input and output elements 15 and 16. The command part is written by the use of command words shown in the following TABLE.

TABLE

| COMMAND WORD | MEANING |
| --- | --- |
| STR | Store contents of PF register in PDS. An addressed bit in the image register IR is transferred to the PF register. |
| OR | The bit addressed in the image register is logically "ORed" with the contents of the PF register and the resultant bit replaces the PF register contents. |
| AND | The bit addressed in the IR is logically "ANDed" with the contents of the PF register and the resultant bit replaces the PF register contents. |
| OUT | The contents of the PF register is placed into the addressed bit location of the IR. |

In the command words, there are test commands (STR, OR and AND), and an output command (OUT). The input instruction is composed of one test command, and the output instruction is composed of one output command. An example of input and output instructions are STR X1 and OUT Y4, respectively, wherein X1 and Y4 represent input and output elements 15 and 16. A series of several instructions define a sequence block and are stored in a regular order in the memory cells having a series of memory addresses. The sequence block is composed of one output instruction and at least one input instruction. Accordingly, the sequence program consists of a number of such sequence blocks.

The sequence instruction display system DS for displaying a desired sequence instruction and the on-off state of the corresponding input or output element 15 or 16 is comprised of a computer 20, a read-only memory ROM, a buffer memory BM and a manipulation and display panel MD. The computer 20 has a random access memory RAM and an address counter AC and a flag FG so as to control the processing operation of the display system DS in accordance with a system program stored in the read-only memory ROM. Reference characters A1, A2 and A3 denote first, second and third address buses to transmit a memory address, and reference characters D1, D2 and D3 denote first, second and third data buses to transmit a sequence program and the on-off state signal of the input and output elements 15 and 16. The computer 20 is connected by means of the second address and data buses A2 and D2 to the read-only memory ROM and to the manipulation and display panel MD through an interface circuit 23. Second address and data gates GA2 and GD2 are provided to connect the second address and data buses A2 and D2 to the third address and data buses A3 and D3, respectively, so that the computer 20 is connected to the buffer memory BM, which is connected to the third address and data buses A3 and D3. First address and data gates GA1 and GD1 are provided to connect the third address and data buses A3 and D3 to the first address and data buses A1 and D1 so as to permit the transference of the sequence program from the sequence controller SC to the display system DS. A line L1 connected to the first data gate GD1 is provided to transmit the on-off state of the input and output elements 15 and 16. A clock gate G4 is provided connected to the buffer memory BM to transmit clock signals CS through a line L2 thereby to permit the buffer memory BM to store a sequence program on an on-line basis with the scan of the program memory 11 in the sequence controller SC. In other words, in accordance with the clock signals, storing a sequence program in the buffer memory BM is synchronized with reading out the same from the program memory 11. The buffer memory BM has a capacity to store the largest sequence block of the sequence program. In this embodiment, the buffer memory BM has 64 memory cells and is capable of storing a sequence block consisting of 64 sequence instructions, and is addressed by a 6-bit memory address which consists of the last 6-bits of the 12-bit memory address transmitted from the sequence controller SC through the first and third address buses A1 and A3. A register RG is connected to the second data bus D2 so as to store an output instruction which is output from the computer 20. A comparator 27 is connected to the register RG and outputs a coincidence signal S1 to a gate G5 when it detects the coincidence of the output instruction stored in the register RG with an output instruction transmitted from the sequence controller SC through the third data bus D3. The gate G5 is connected through a line L3 to the first address and data gates GA1 and GD1 and the clock gate G4. The gates GA1, GD1 and G4 are opened in response to a signal L output from the computer 20 and are closed when the coincidence signal S1 is supplied thereto from the comparator 27 through the gate G5 and the line L3.

A latch register LR is connected to the second data bus D2, the line L3, and the third address bus A3 so as to store therein a memory address transmitted through the third address bus A3 from the sequence controller SC, when the coincidence signal S1 is output from the comparator 27.

The computer 20 may be a general-purpose digital computer or may be a microprocessor which is widely used in various controllers.

Figure 2:
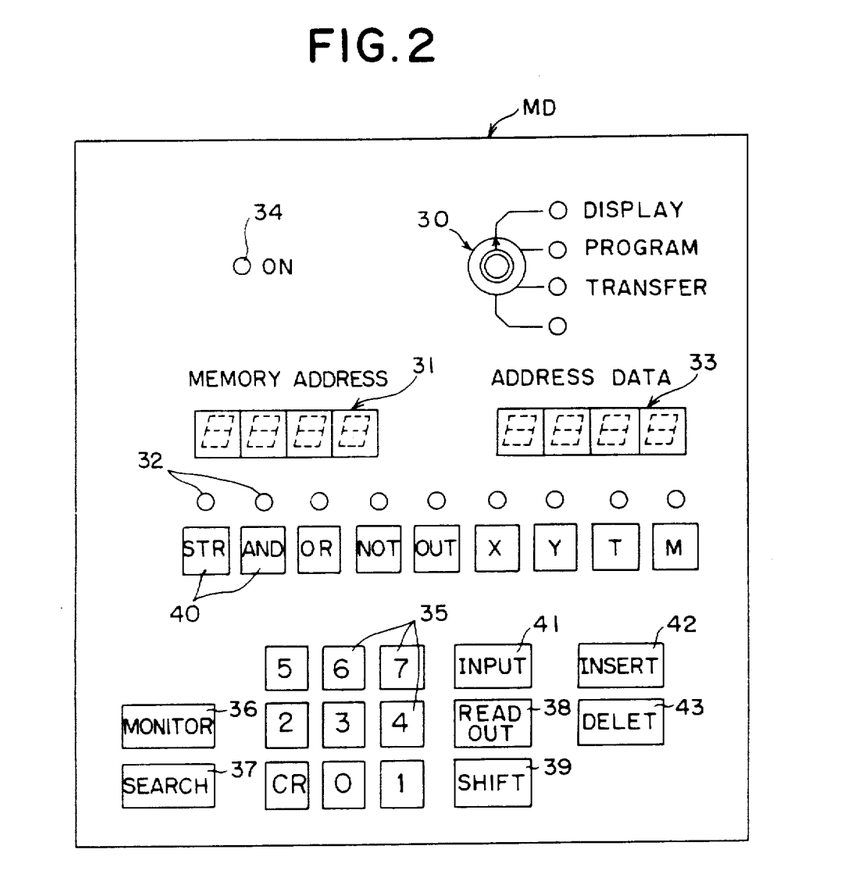
FIG. 2 is a schematic illustration which shows details of a manipulation and display panel shown in FIG. 1.

FIG. 2 shows the detail of the manipulation and display panel MD which is arranged to display a desired sequence instruction and is used to input and modify a sequence program. The manipulation and display panel MD includes a mode selection switch 30 for selecting one of DISPLAY MODE, PROGRAM MODE, and TRANSFER MODE; display devices 31 through 34 for displaying a sequence instruction; instruction keys 35 through 39 for instructing the computer 20 to carry out various operations; and editing keys 40 through 43 for inputting a new sequence program and for modifying the sequence program stored in the program memory 11.

The display devices include an address display device 31 for displaying a memory address of the program memory 11 at which the sequence instruction to be checked is stored, a command word indicator 32 for indicating the command word of the sequence instruction, an address data display device 33 for displaying address data of the corresponding input or output element 15 or 16, and an on-off indicator 34 for indicating the on-off state of the input or output element 15 or 16. The instruction keys, which are used in DISPLAY MODE, include numeric keys 35 for designating a memory address or address data of an input or output element 15 or 16, a monitor key 36 for instructing the on-off state indicator 34 to display the on-off state of the input or output element 15 or 16 which is designated by the numeric keys 35, a search key 37 for instructing the display devices 31 through 34 to display a sequence instruction and related information, a read-out key 38 for instructing the command word indicator 32 and the address data display device 33 to display a sequence instruction which is stored at the memory address designated by the numeric keys 35, and a shift key 39 for determining which one of a memory address or address data the numeric keys 35 are to designate. The editing keys, which are used in PROGRAM MODE, include command keys 40 for designating a sequence instruction, an input key 41, an insert key 42 and a delete key 43, so as to input a new sequence instruction designated by the command keys 40 and the numeric key 35 in the program memory 11 and to modify a sequence program stored in the program memory 11.

Figure 3:
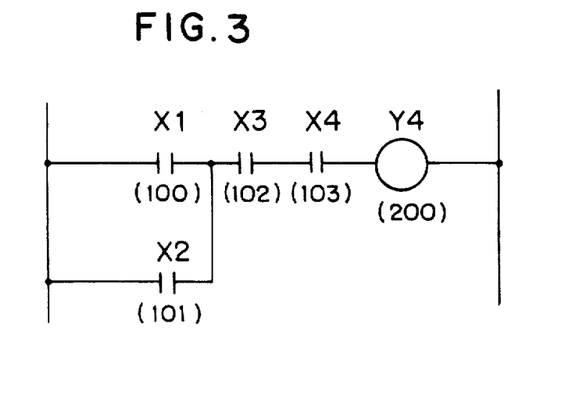
FIG. 3 is a schematic diagram of an example of a relay circuit.
Figure 4:
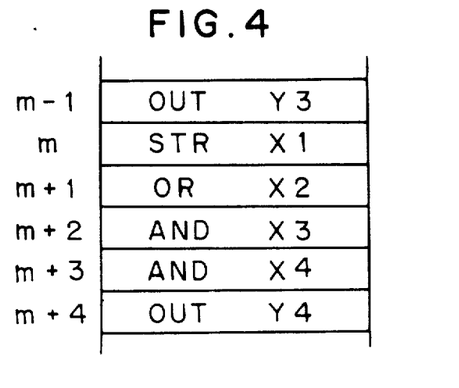
FIG. 4 is an explanatory chart illustrating organization of a program memory of the programmable sequence controller shown in FIG. 1 and a sequence program stored therein.

FIG. 3 shows an example of a relay circuit which comprises input elements X1, X2, X3 and X4 with address data 100, 101, 102 and 103 and an output element Y4 with address data 200. FIG. 4 shows a portion of the program memory 11 which stores at the memory addresses m to m+4 a sequence block representing the relay circuit shown in FIG. 3. The sequence block consists of input instructions STR X1, OR X2, AND X3, AND X4 which respectively correspond to the input elements X1, X2, X3 and X4, and output instruction OUT Y4 which corresponds to the output element Y4. Though the content stored in a memory cell having a memory address is expressed in terms of a sequence instruction in FIG. 4, a sequence instruction is encoded into a 16-bit binary code to be stored in the program memory 11, wherein the command word such as STR or OUT is encoded into a 3-bit binary code and the operand such as X1 or Y4 is encoded into a 12-bit binary code representing its address data. The remaining one bit is reserved to represent the on-off state of the corresponding input or ouput element 15 or 16.

When a machine failure has occurred or an output element has not been energized, it is necessary to locate an input element which concerns the energization of the output element in order to determine the cause of the machine failure. For this purpose, a machine operator manipulates the mode selection switch 30 to select DISPLAY MODE and then manipulates the numeric keys 35 to designate the address data of the output element. After that, when the search key 37 is depressed, the processing operation of the computer 20 is initiated for storing in the buffer memory BM a sequence block which has the output instruction corresponding to the designated output element. Then, each time the search key 37 is depressed, the computer 20 operates to display on the manipulation and display panel MD sequence instructions of the stored sequence block as well as the on-off state of the corresponding input and output elements one after another.

The processing of the computer 20 will be explained hereinafter, taking an example of the relay circuit and the corresponding sequence program shown in FIGS. 3 and 4.

When the output element Y4 having the address data 200 is not energized, the operator starts to locate an input element whch concerns the energization of the output element Y4. When some of the numeric keys 35 are depressed for address designation of the output element Y4 to be checked and then the search key 37 is depressed, the computer 20 carries out a storing operation to store in the buffer memory BM a sequence block which has the designated output instruction OUT Y4 and a display operation to display on the display devices 31 through 34 one of the sequence instructions of the sequence block, in accordance with processing steps shown in FIGS. 5 and 6.

Figure 5:
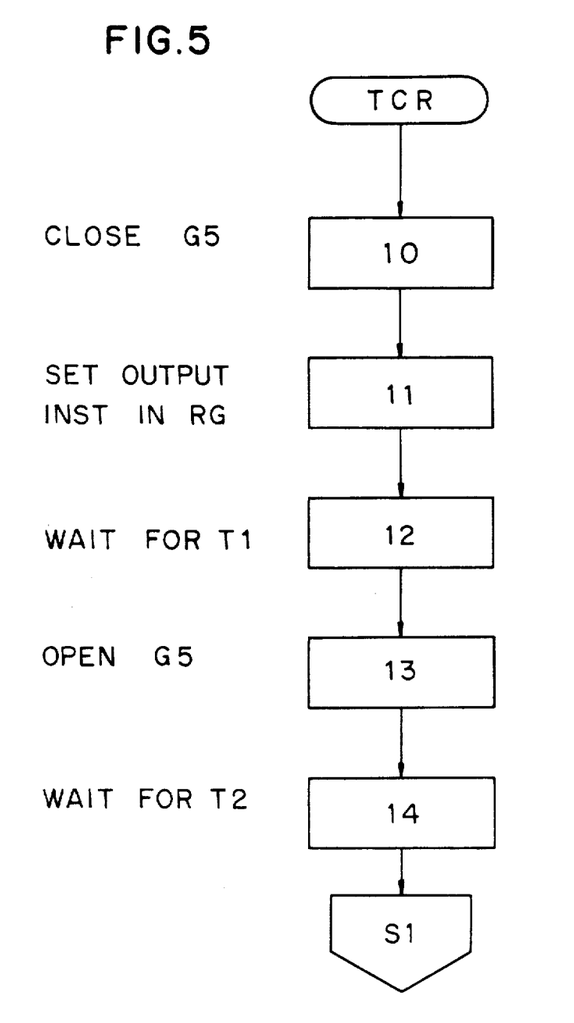
FIG. 5 is a flow chart illustrating the processing that a computer shown in FIG. 1 performs to store in a buffer memory shown in FIG. 1 a desired sequence block transmitted from the sequence controller.

More specifically, when the numeric keys 35 are manipulated to designate the address data 200 of the output instruction OUT Y4, and the search key 37 is successively depressed, the computer 20 closes the gate G5 in step 10 and sets into the register RG the output instruction OUT Y4 in step 11. In this stage, since the signal L is output from the computer 20, the gates GA1, GD1 and G4 are all opened so that sequence instructions and the on-off states of the corresponding input and output elements 15 and 16 are fed into the buffer memory BM from the sequence controller SC through the buses A1, A3, D1 and D3 and the line L1. The clock signals CS are also supplied to the buffer memory BM through the line L2 and the gate G4. Accordingly, the sequence instructions and the on-off states are stored in the buffer memory BM synchronously with the scan of program memory 11 for reading out the sequence program therefrom. After maintaining the closing of the gate G5 for a predetermined period T1 in step 12, the computer 20 opens the gate G5 in step 13 and keeps it opened for a predetermined period T2.

When the comparator 27, after the gate G5 is opened in step 13, detects the coincidence of the output instruction stored therein with an output instruction transmitted from the sequence controller SC through the third data bus D3, the coincidence signal S1 is output thereby to close the gates GA1, GD1 and G4. As a result, the buffer memory BM completes storage therein of a sequence block which includes the designated output instruction OUT Y4 and is prevented from further storing sequence instructions and the on-off states transmitted from the sequence controller SC. The period T1 is set longer than the period when the largest sequence block can be read out from the program memory 11, and the period T2 is set longer than the period when the sequence program stored in the program memory 11 is fully scanned.

In this embodiment, the gates GA1, GD1 and G4 are arranged to be closed immediately after the output instruction is completed to be stored in the buffer memory BM by making use of the response time of the comparator 27 and the gate G5. However, if desirable, a delay circuit may be provided for adjusting the time when the gates GA1, GD1 and G4 are to be closed.

Accordingly, through the execution of the processing steps 10 through 14, the desired sequence block along with the on-off states is stored in the buffer memory BM.

Figure 7A:
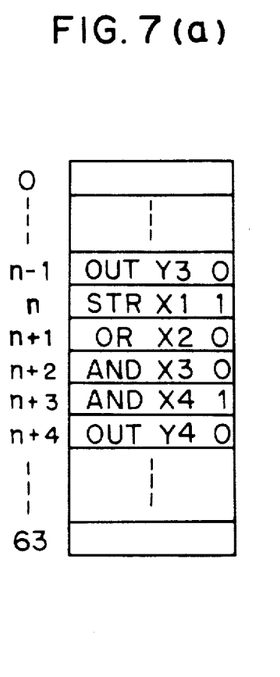
Figure 7B:
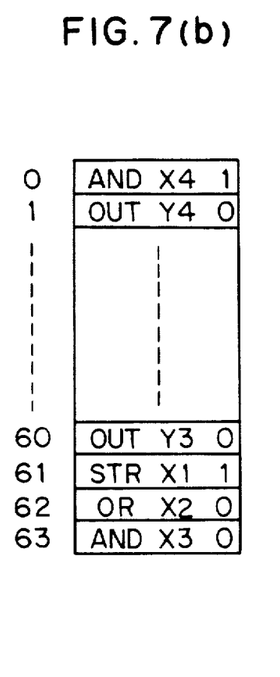

FIGS. 7(a) and 7(b) show the buffer memory BM and sequence instructions stored therein. As mentioned earlier, the last bit of a sequence instruction is reserved to represent the on-off state of the corresponding input or output element 15 or 16, and the on-off state is indicated by a logical value 1 or 0 affixed to each sequence instruction. For example, the input instruction STR X1 1, which is stored at a memory address n in the buffer memory BM, represents the on state of the corresponding input instruction X1 having the address data 100. Further, it should be noted that the buffer memory BM is addressed by the last 6-bits of the 12-bit memory address transmitted through the first and third address buses A1 and A3, and accordingly, after a sequence instruction, for example, AND X3 0 is stored at the last memory address 63, the following instruction AND X4 1 is stored at the first memory address 0, as shown in FIG. 7(b).

Figure 6:
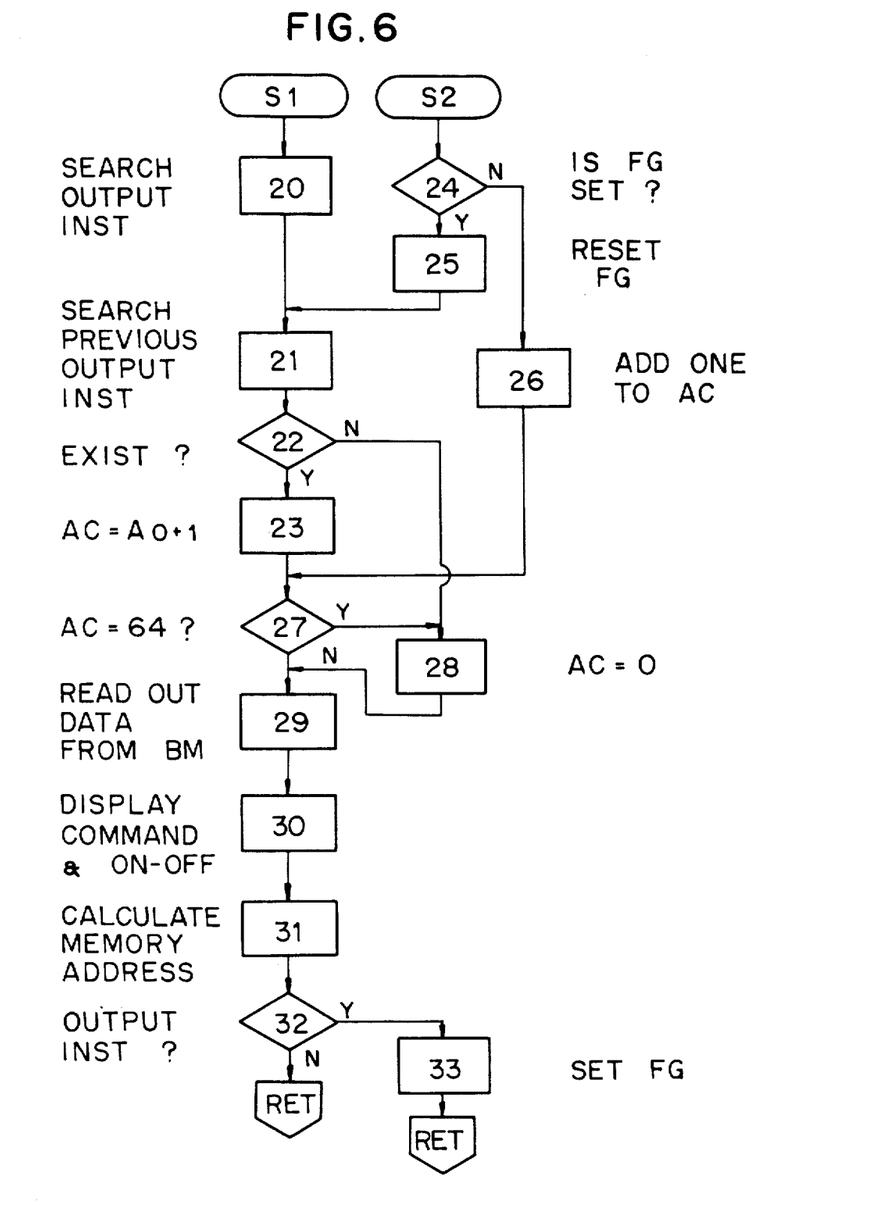
FIG. 6 is a flow chart illustrating the processing that the computer performs to display desired sequence instruction and the on-off state of the corresponding input or output element.

Subsequently, the computer 20 executes the processing steps 20 through 33, shown in FIG. 6, for displaying the sequence instructions of the sequence block stored in the buffer memory BM, one after another each time the search key 37 is depressed.

More specifically, the computer 20 searches the buffer memory BM for the designated output instruction OUT Y4 in step 20, and locates an output instruction OUT Y3 which is stored previous to the designated output instruction OUT Y4 in step 21. If it is ascertained in step 22 that there exists such an output instruction OUT Y3, the processing step advances to step 23. However, if not, the processing step advances to step 28. In step 23, the computer 20 sets into the address counter AC the number A0+1, where A0 is the memory address at which the located output instruction OUT Y3 is stored. Then, if it is ascertained in step 27 that the content A0+1 of the address counter AC is 64, the content is changed into 0 which designates the first memory address of the buffer memory BM in step 28. If the content is not ascertained to be 64 in step 27, step 29 is reached. After step 27 or step 28, the computer 20 reads out the sequence instruction STR X1 1 from the memory cell having the memory address A0+1 or 0 designated by the address counter AC in step 29. It is noted that, in the example shown in FIG. 7(a), A0 is n−1 and A0+1 is n, and the sequence instruction STR X1 is the first instruction of the sequence block stored in the buffer memory BM. In step 30, the computer 20 operates to display the command word STR, the address data 100 and the on state of the read out sequence instruction STR X1 1 on the command word display device 32, the address data display device 33 and the on-off state indicator 34. In next step 31, the computer 20 calculates the 12-bit memory address m of the program memory 11 at which the read out sequence instruction STR X1 is stored, and displays the same on the memory address display device 31. This calculation is carried out in cooperation with the latch register LR, wherein the 12-bit memory address m+4 is stored in response to the coincidence signal S1 output from the comparator 27, and the 12-bit memory address m is obtained by subtracting 4 from m+4, wherein 4 is the difference of the 6-bit memory addresses n and n+4 at which the read out instruction STR X1 and the designated output instruction OUT Y4 are stored and m+4 is the 12-bit memory address stored in the latch register LR.

After calculating and displaying the 12-bit memory address m in step 31, the computer 20 checks in step 32 whether the displayed sequence instruction STR X1 1 is an output instruction or not. If it is an output instruction, the flag FG is set in step 33. If not, the processing of the computer 20 returns to a main routine, not shown.

Subsequently, when only the search key 37 is depressed, the computer 20 executes steps 24 through 33 for displaying the sequence instruction and the on-off state which are stored following the sequence instruction STR X1 1 which has been displayed in the previous display operation.

Specifically, the computer 20 checks in step 24 whether the flag FG is set or not. If it is set, the processing advances to step 25 to reset the flag FG and then to step 21. If not, step 26 is reached to add one to the address counter AC and then the following steps 27 through 33 are executed. In case of the example, since the input instruction STR X1 has been displayed and the flag FG has been reset, the computer 20 executes steps 26 through 33 for displaying the next sequence instruction OR X2 along with its off state.

The computer 20, each time the search key 37 is depressed, executes steps 26 through 33 for displaying the following sequence instruction until an output instruction is displayed in the previous operation. After the output instruction OUT Y4 is displayed, the depression of the search key 37 advances the processing of the computer 20 from step 24 to step 25, because the flag FG has been set. As a result, the input instruction STR X1 and its on state are again displayed.

Accordingly, the machine operator is able to monitor every sequence instruction of the sequence block stored in the buffer memory BM by repeatedly depressing the search key 37.

Due to the provision of steps 27 and 28, the sequence instructions are successively displayed, even if some of them are separately stored in the buffer memory BM as shown in FIG. 7(b). In that case, after the input instruction AND X3 is displayed, the following input instruction AND X4 will be displayed, because the content of the address counter AC will be changed from 63 to 0 by executing steps 27 and 28.

The second embodiment of the sequence instruction display system DS will be explained with respect to FIGS. 8 through 11. The display system DS further includes a counter 50, a decoder 51, an inverter 52, an auxiliary counter 53, and AND gate AG and a gate GA4, and the gate G5 is removed, as compared with the first embodiment shown in FIG. 1. The counter 50 is connected to the third address bus A3 through the gate GA4 so as to carry out the address designation of the buffer memory BM. Each time the buffer memory BM stores one sequence instruction in response to the clock signal CS which is transmitted from the sequence controller SC through the gate G4, the content of the counter 50 is incremented by one. The AND gate AG is connected to the comparator 27 through the inverter 52 and to the third data bus D3 through the decoder 51 so as to output a signal S2 when an output instruction is transmitted from the sequence controller SC. The content of the counter 50 is reset to be zero in response to the signal S2. However, when the coincidence signal S1 is output from the comparator 27, the signal S2 is not output.

Figure 8:
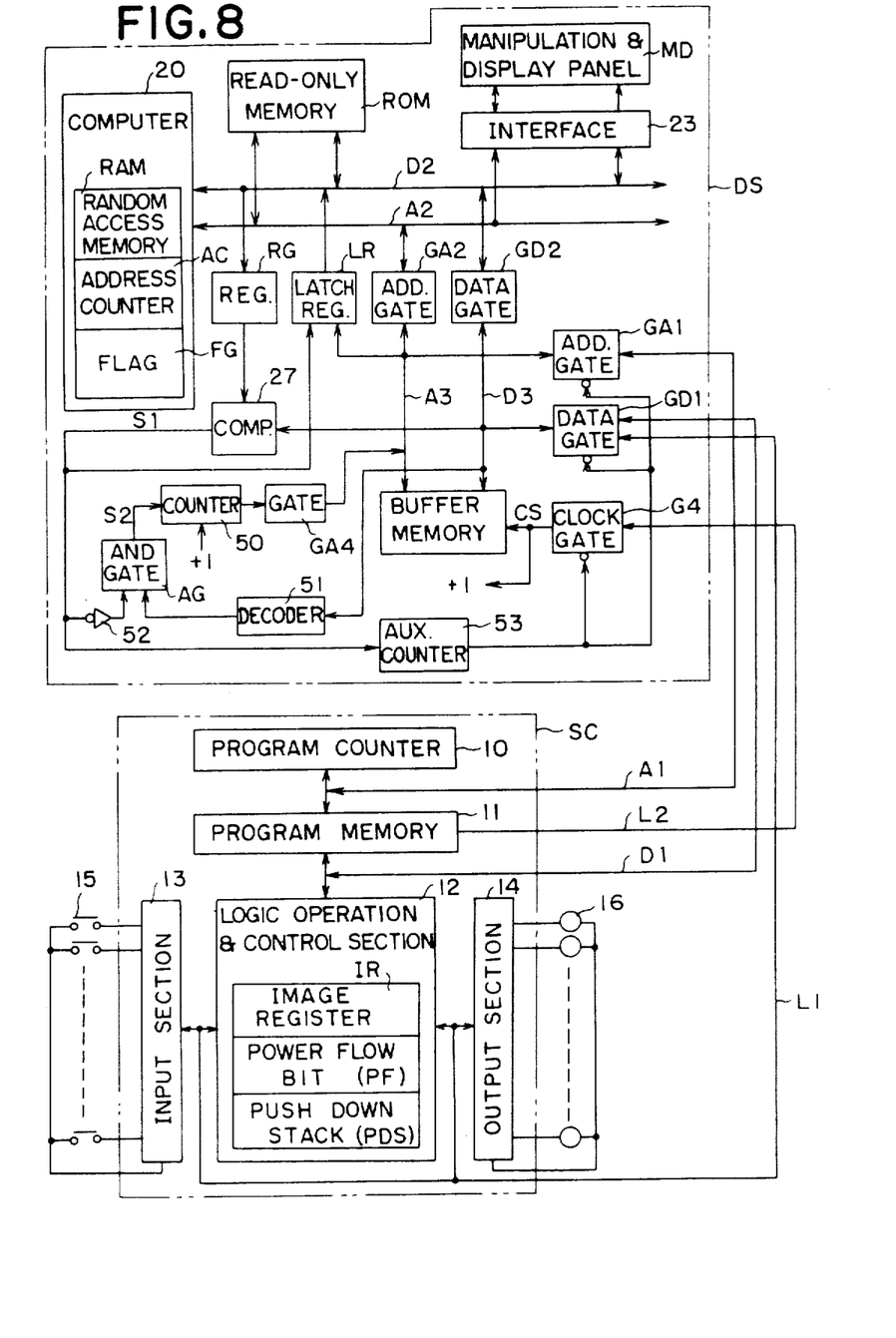
FIG. 8 is a block diagram illustrative of a second embodiment of the present invention.

Accordingly, when a sequence block consisting of a plurality of sequence instructions is transmitted from the sequence controller SC, the first instruction is stored at the first memory address 0 in the buffer memory BM and the following instructions are stored in order at the following addresses therein. When the last instruction, which is an output instruction, is transmitted, the counter 50 is reset in response to the signal S2, if it is not the output instruction designated by the numeric key 35. If it is the designated output instruction to be checked, however, the counter 50 is not caused to be reset, and the gates GA1 and GD1 are caused to be closed in response to the coincidence signal S1 thereby to prevent the buffer memory BM from further storing a sequence instruction. As a result, the sequence block having the designated output instruction is stored in the buffer memory BM. The auxiliary counter 53 is provided to delay the closing of the gates GA1 and GD1 until the coincidence signal S1 is output twice in order to avoid storing an incomplete sequence block in the buffer memory BM.

The processing of the computer 20 in the second embodiment will be explained hereinafter, taking the example of a relay circuit and the corresponding sequence program shown in FIGS. 3 and 4.

Figure 9:
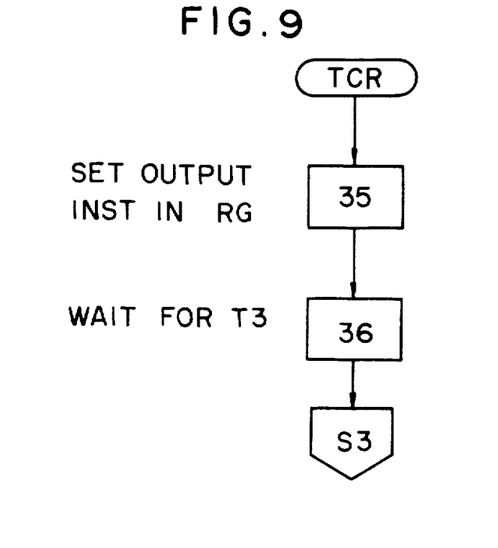
FIGS. 9 and 10 are flow charts illustrating the processing operation of a computer shown in FIG. 8.
Figure 10:
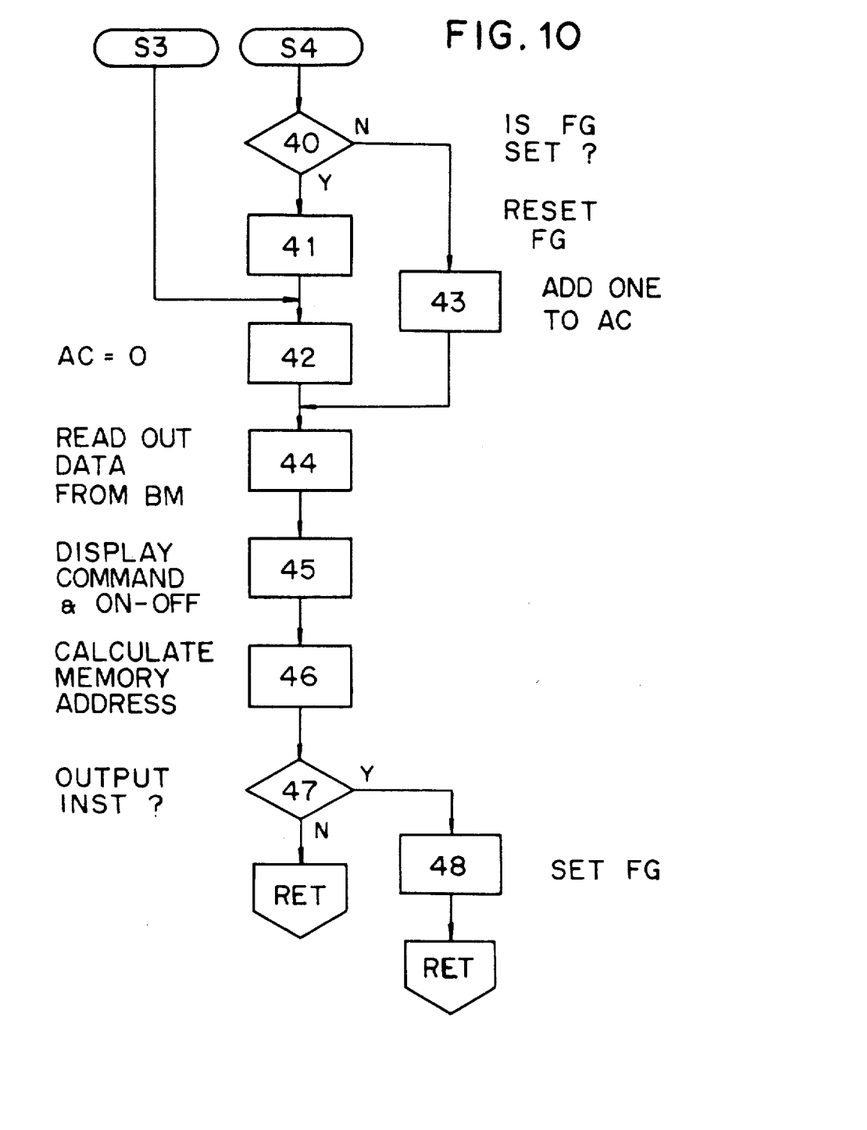

When some of the numeric keys 35 are depressed for address designation of the output element Y4 to be checked and then the search key 37 is depressed, the processing of the computer 20 starts to execute steps 35 and 36 shown in FIG. 9 for storing in the buffer memory BM a sequence block which has the designated output instruction OUT Y4, and steps 42 through 48 shown in FIG. 10 for displaying one of the sequence instructions of the sequence block.

More specifically, when the numeric keys 35 are manipulated to designate the address data 200 of the output instruction OUT Y4 and the search key 37 is successively depressed, the computer 20 sets into the register RG the output instruction OUT Y4 in step 35. In this stage, since the signal L is output from the computer 20, the gates GA1, GD1 and G4 are opened so that sequence instructions and the on-off states of the input and output elements 15 and 16 are fed into the buffer memory BM from the sequence controller SC. In response to the clock signals CS transmitted through the line L2, the sequence instructions are stored at the memory addresses of the buffer memory BM which are designated by the counter 50. In step 36, the advance of the processing operation is prevented for a predetermined period T3, which is set long enough to permit the concidence signal S1 to be output twice from the comparator 27. Accordingly, through the execution of the processing steps 35 and 36, the desired sequence block along with the on-off states is stored in the buffer memory BM by means of the counter 50, the AND gate AG, the comparator 27 and so on.

After waiting for the period T3, the computer 20 nextly executes steps 42 through 48 for displaying the first sequence instruction STR X1 of the sequence block stored in the buffer memory BM.

Figure 11:
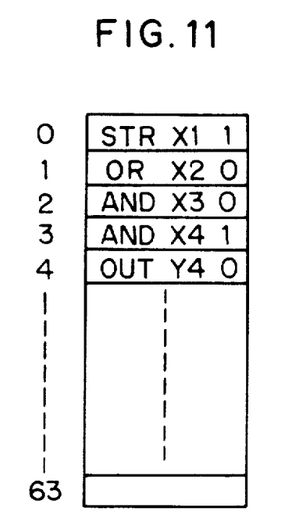
FIG. 11 is an explanatory chart illustrating the organization of a buffer memory shown in FIG. 8 and a sequence program stored therein.

After storing the sequence block in the buffer memory BM as shown in FIG. 11, the computer 20 sets 0 into the address counter AC so as to designate the first memory address 0 in step 42. Then the computer 20 executes steps 44 through 48, which are the same as the steps 29 through 33 shown in FIG. 6, for displaying on the display devices 31 through 34 the sequence instruction STR X1 and the on state, in this case, which are stored at the memory address designated by the address counter AC.

Subsequently, when only the search key 37 is depressed, the computer 20 checks in step 40 whether the flag FG is set or not. If it is set, the processing advances to step 41 to reset the flag FG and then to step 42 to set into the address counter AC the first memory address 0. If the flag FG is ascertained to be reset in step 40, step 43 is reached to add one to the address counter AC. After step 42 or 43, the computer 20 again executes steps 44 through 48 for displaying the following instruction OR X2 and the off state, in this case.

As mentioned above, according to the present invention, a sequence instruction and its on-off state are transferred from the program memory 11 of the sequence controller SC to the buffer memory BM of the sequence instruction display system DS on an on-line basis with the scan of the program memory 11 in the sequence controller SC. Accordingly, the sequence control operations of the sequence controller SC are not interrupted. Further, the sequence instruction display system DS according to the present invention is capable of being used with a sequence controller which does not have an interruption function.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A sequence instruction display system for use with a sequence controller having a program memory for storing a plurality of sequence program blocks each of which includes at least one output instruction and at least one input instruction, said sequence instruction display system comprising:
   memory means for storing input and output instructions included in each of said sequence program blocks and the corresponding on-off states;
   data transfer means connected to said memory means for transferring the input and output instructions and the corresponding on-off states sequentially from said sequence controller to said memory means synchronously with a scan of said program memory which said sequence controller executes for successively reading out said input and output instructions from said program memory;

designating means connected to said data transfer means for designating an output instruction included in one of said sequence program blocks to be displayed;

storing control means connected to said data transfer means for detecting that said one of sequence program blocks including said output instruction designated by said designating means has been stored in said memory means, so as to prevent said data transfer means from further transferring the input and output instructions and the corresponding on-off states to said memory means; and display means connected to said memory means for displaying the input and output instructions and the corresponding on-off states based upon the same being stored in said memory means.

2. A sequence instruction display system as recited in claim 1, wherein:

said memory means has a capacity to store therein the largest sequence program block stored in said program memory; and said data transfer means comprises first line means for transferring clock signals from said sequence controller to said memory means so as to synchronize storing the input and output instructions and the corresponding on-off states in said memory means with reading out the input and output instructions from said program memory;

said memory means being enabled to store one of the input and output instructions and the corresponding on-off state therein each time when receiving one of said clock signals.

3. A sequence instruction display system as recited in claim 2, wherein said sequence controller also comprises a program counter for supplying said program memory with memory address data so as to execute the scan of said program memory, and wherein said data transfer means further comprises:

second line means for transferring the input and output instructions read out from said program memory and the corresponding on-off states which said sequence controller generates respectively when executing the read-out input and output instructions; and third line means for transferring said memory address data from said program counter to said memory means so that the input and output instructions and the corresponding on-off states are respectively stored at storage addresses of said memory means designated by said memory address data supplied from said program counter of said sequence controller.

4. A sequence instruction display system as recited in claim 3, wherein said data transfer means further comprises:

a first gate provided on said second line means for integrating the input and output instructions respectively with the corresponding on-off states so as to enable each integrated instruction data to be stored at one storage address of said memory means.

5. A sequence instruction display system as recited in claim 4, wherein said data transfer means further comprises:

a second gate provided on said first line means for controlling the transfer of said clock signals from said sequence controller to said memory means;

said storing control means being connected to said second gate for closing said second gate when detecting that said sequence program block to be displayed has been stored in said memory means.

6. A sequence instruction display system as recited in claim 5, wherein said storing control means comprises:

a register connected to said designating means for storing the output instruction designated by said designating means; and a comparator connected to said register, said second line means and said second gate for detecting the coincidence of the output instruction stored in said register with the output instruction transferred along said second line means and for outputting a coincidence signal to said first gate when the coincidence is detected, so as to close said first gate.

7. A sequence instruction display system as recited in claim 6, wherein said display means comprises:

searching means for searching said memory means for a certain sequence instruction;

calculating means for calculating the memory address of said searched sequence instruction; and a display device for displaying the command word, the corresponding on or off state and the memory address of said searched sequence instruction.

8. A sequence instruction display system as recited in claim 2, wherein said storing control means comprises means for generating a coincidence signal when the output instruction designated by said designating means coincides with an output instruction transferred to said memory means;

further comprising:

address control means responsive to the input instructions transferred to said memory means and said coincidence signal for designating memory addresses of said memory means so that the input and output instructions included in one of said sequence program blocks to be displayed and the corresponding on-off states are stored in said memory means in turn from the first address thereof.

9. A sequence instruction display system as recited in claim 8, wherein:

said data transfer means comprises a first gate provided on said first line means for selectively transferring said clock signals from said sequence controller to said memory means; and said storing control means comprises: a gate control counter connected to said first gate for closing said first gate each time said coincidence signals are received twice in succession.

10. A sequence instruction display system as recited in claim 9, wherein said address control means comprises:

an address counter comprising means for incrementing its content by one in response to each of said clock signals, said address counter connected to said memory means and provided for designating storage addresses of said memory means in turn from the first address thereof;

a decoder connected to said data transfer means for outputting a detection signal each time when receiving a first one of the input instructions included in each of said sequence program blocks; and a reset control gate connected to said address counter for resetting said address counter in response to said detection signal from said decoder, but preventing the resetting of said adddress counter while receiving said coincidence signal from said storing control means.

* * * * *